United States Patent [19]
Devlin

[11] Patent Number: 5,711,702
[45] Date of Patent: Jan. 27, 1998

[54] CURVE CUTTER WITH NON-PLANAR INTERFACE

[75] Inventor: John T. Devlin, Bridgewater, N.J.

[73] Assignee: Tempo Technology Corporation, Somerset, N.J.

[21] Appl. No.: 703,864

[22] Filed: Aug. 27, 1996

[51] Int. Cl.⁶ ................................................. B24B 33/00
[52] U.S. Cl. .......................... 451/540; 451/541; 451/542; 175/428; 175/432
[58] Field of Search ................................ 451/540, 541, 451/542; 407/118, 119; 125/39; 51/307, 309; 175/428, 432

[56] References Cited

U.S. PATENT DOCUMENTS

| | | | |
|---|---|---|---|
| 4,592,433 | 6/1986 | Dennis | 175/329 |
| 4,690,691 | 9/1987 | Komanduri | 51/293 |
| 4,764,434 | 8/1988 | Aronsson et al. | 428/565 |
| 4,784,023 | 11/1988 | Dennis | 175/428 |
| 4,861,350 | 8/1989 | Phaal et al. | 51/307 |
| 4,954,139 | 9/1990 | Cerutti | 51/293 |
| 5,007,207 | 4/1991 | Phaal | 175/432 |
| 5,011,515 | 4/1991 | Frushour | 51/307 |
| 5,054,246 | 10/1991 | Phaal et al. | 51/204 |
| 5,120,327 | 6/1992 | Dennis | 407/119 |
| 5,217,081 | 6/1993 | Waldenstrom et al. | 175/420 |
| 5,351,772 | 10/1994 | Smith | 175/428 |
| 5,355,969 | 10/1994 | Hardy et al. | 175/432 |
| 5,379,854 | 1/1995 | Dennis | 175/434 |
| 5,472,376 | 12/1995 | Olmstead et al. | 175/432 |
| 5,484,330 | 1/1996 | Flood et al. | 175/432 |
| 5,486,137 | 1/1996 | Flood et al. | 175/432 |
| 5,598,750 | 2/1997 | Griffin et al. | 175/42 |

FOREIGN PATENT DOCUMENTS

| | | | |
|---|---|---|---|
| 655 548 A1 | 11/1994 | European Pat. Off. | E21B 10/56 |
| 655 549 A1 | 11/1994 | European Pat. Off. | E21B 10/56 |
| 687 799 A1 | 6/1995 | European Pat. Off. | E21B 10/56 |
| 687 800 A1 | 6/1995 | European Pat. Off. | E21B 10/56 |

*Primary Examiner*—Robert A. Rose
*Assistant Examiner*—George Nguyen
*Attorney, Agent, or Firm*—Pravel, Hewitt, Kimball & Krieger

[57] ABSTRACT

A cutting compact has a superhard abrasive layer bonded to a substrate layer, wherein the configuration of the interface between abrasive and substrate layers is a non-planar, or three dimensional, interface which increases the surface area between the layers available for bonding and optimizes the structural integrity of the compact according to its desired application. In one embodiment, the topography between the substrate and abrasive layers of the compact is characterized by interlocking concentric circular grooves and channels of varying width, depth and shape. In another embodiment, the interface between the grooves and channels is rounded and smooth. In additional embodiments, the grooves and channels are positioned on substantially angled interfaces or substantially curved interfaces. Additional configurations of the present invention provide that the grooves alternatingly start and stop along the path in interfacing with their respective channels. Yet additional configurations disclosed include variations in the width of the groove/channel along the diameter of the abrasive layer and the substrate layer. The present invention thus provides an increased mechanical interlock between the abrasive layer and the substrate layer. The increased surface area between the substrate and abrasive layers promotes the sintered bond between the layers, thereby improving resistance to spalling or delamination of the abrasive layer from the substrate layer. Another advantage is that the number, depths and widths of the channels can be adjusted to meet the desired performance characteristics of the compact and to strengthen points of particular stress according to specific applications of the compact.

26 Claims, 5 Drawing Sheets

CURVE CUTTER WITH NON-PLANAR INTERFACE

BACKGROUND OF THE INVENTION

1. Field of the Invention

The present invention relates to wear and impact-resistant bodies having one or more layers of an abrasive material and a substrate material and, more particularly, to abrasive cutting elements having a non-planar interface between the abrasive and substrate layers.

2. Description of the Related Art

Many industrial applications such as subterranean drilling, cutting, machining, milling, grinding, and other abrasive operations require tools with high abrasion resistance and wear resistance. In these instances, abrasive compacts designed specifically to provide the needed high abrasion/wear resistance are deployed. Each Abrasive Compact typically has an abrasive layer of sintered polycrystalline diamond, wherein the polycrystalline diamond layer is created by subjecting a mass of individual crystals to high pressure and temperature processes or to chemical vapor deposition processes or physical vapor deposition such that intracrystalline bonding occurs. These abrasive compacts are called polycrystalline diamond (PCD) compacts.

Each PCD compact is a coherent, polycrystalline hard composite having a substrate, or mounting layer and a superhard abrasive layer. The substrate layer or the mounting layer is typically a metal carbide substrate, while the superhard abrasive layer is made of a material made from synthetic or natural diamond, cubic boron nitrite (CBN), wurtzite boron nitrite, and combinations thereof. The superhard abrasive layer typically consists of fine diamond crystals, while the substrate layer typically consists of tungsten carbide. After the abrasive layer and the substrate have been manufactured, they are bonded together using a process known as sintering, or sintered bonding, as is known to those skilled in the art and will not be described in detail here. The resulting PCD compact is subsequently mounted to the bit body of the drilling equipment.

During use, abrasive cutting compacts are subject to temperature extremes during the formation and the mounting on the bit body. Further, they are subjected to a high temperature and heavy lead when the drill is used down a bore hole. As a result of such conditions, spalling and delamination of the abrasive layer may occur, causing a potential separation and loss of the diamond or other superhard material on the cutting surface. Delamination resulting from the stress between the substrate and the abrasive layer generates undesirable fractures in the layers of the compact.

The delamination and fracture of the PCD are caused by a number of factors, including impact forces during use, as well as thermally induced stresses occurring whenever the PCD compact heats from use (or even during initial creation). Such thermal stresses are caused by the differing coefficients of thermal expansion between the substrate layer and the abrasive layer, as well as differences in elastic moduli which cause inherent residual stresses in the PCD that increase with radial position away from the center. In addition to thermal and impact forces, the topography of the interface between the abrasive layer and substrate layer may further contribute to the delamination and the structural integrity of the layer, as cracks may spread faster with an inappropriate topography. Thus, attempts have been made to improve the bond between the abrasive layer and the substrate layer by configuring the interface so as to provide a degree of mechanical interlocking between the abrasive layer and the substrate layer. For example, the substrate layer surface may be cut with parallel dovetail grooves to increase the surface area between the abrasive layer and the substrate layer on which bonding can occur. Alternatively, the substrate surface may be cut with symmetrical grooves in such forms as concentric circular grooves or ribs, as shown in U.S. Pat. No. 5,011,515. However, U.S. Pat. No. 5,011,515 does not refer to concentric circular grooves. Further, as shown in European Patent EP 0 687 799 A1, the concentric grooves or ribs may vary in height, with the height being maximum in the center of the abrasive and substrate layers and progressively decreasing toward the perimeter of the layers. However, the PCD shown in the EPO patent does not deploy upward-sloped, downward-sloped, or curvi-linear interface configurations to enhance the bonding strength between the PCD layers. Further, the PCD shown in the EPO patent does not vary groove widths and shapes to provide additional bonding capabilities to reduce the risk of delamination.

The delamination of the abrasive layer ultimately causes PCDs to fail. Such failures are expensive, not only in terms of the cost of replacing the PCDs, but also in the field down-time cost, thereby greatly increasing the cost of the drilling operation, especially in subterranean drilling, where the PCDs are not readily accessible.

SUMMARY OF THE INVENTION

The present invention provides a compact where the topography of the interface between the abrasive and substrate layers provides both increased surface area on which bonding could occur and more uniformly stress distribution over the entire surface of the compact. A non-planar, or three dimensional, interface topography between the abrasive and substrate layers is used in the invention to increase the surface area between the layers available for bonding and to optimize the structural integrity of the compact according to its desired application.

In one embodiment, the topography between the substrate and abrasive layers of the compact is characterized by interlocking concentric circular grooves and channels of varying widths, depths and shapes. In that embodiment, the depths of the grooves extending into channels within the substrate layer are deeper at the innermost concentric channel in the substrate surface, and become progressively shallower toward the outermost concentric channel in the substrate surface. In another embodiment, the groove and channel interface is rounded and smooth. In other embodiments, the grooves and channels are positioned on a substantially angled interface or a substantially curved interface. The present invention also discloses configurations where the grooves alternatingly start and stop along the path in interfacing with their respective channels. Additional configurations disclosed include variations in the width of the groove/channel along the diameter of the abrasive layer and the substrate layer.

The present invention thus provides increased mechanical interlock between the abrasive layer and the substrate layer. Further, the increased surface area between the substrate and abrasive layers promotes the sintered bond between them, thereby improving resistance to the spalling or the delamination of the abrasive layer from the substrate layer. Another advantage is that the number, depths and widths of the channels can be adjusted to meet the desired performance characteristics of the compact. Yet another advantage of the present invention is that the placement of channels with specific widths and depths may be configured to uniformly strengthen points of particular stress according to specific applications of the compact to improve the resistance of the cutting compact to delamination of the abrasive layer.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
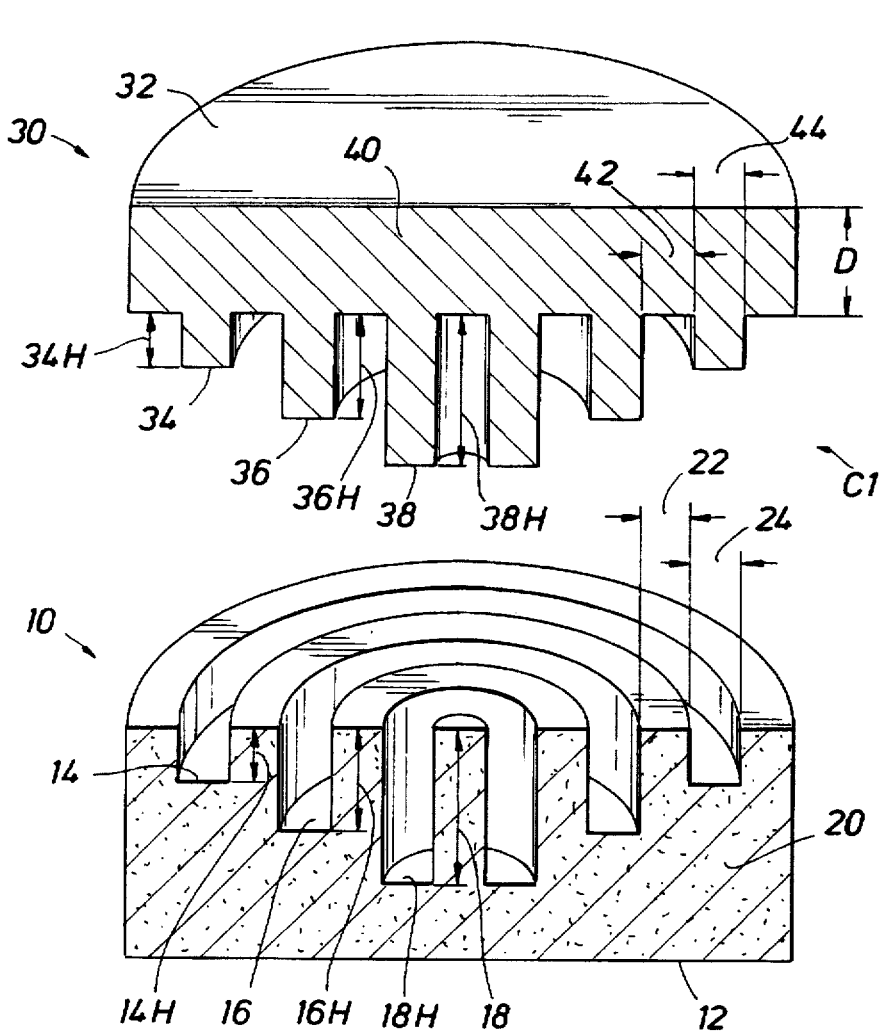
FIG. 1 is an exploded perspective view of an abrasive layer and a substrate layer of a composite compact in accordance with the present invention.

Turning now to FIG. 1, an exploded view of a composite compact C1 of the present invention is disclosed. In FIG. 1, a substrate layer 10 and an abrasive layer 30 are shown as having a substrate base cross-section 20 and an abrasive base cross-section 40. The abrasive base cross-section 40 has a visible height D and a top surface 32. On the bottom of the abrasive layer 30 are a plurality of concentric, downwardly pointing annular ring projections 34, 36, and 38 having increasing projectional depths. The annular ring projections 34, 36 and 38 form a plurality of hollow and increasingly taller cylindrical cores which are projected downwardly from the bottom of the abrasive layer 30. Thus, projecting downwardly at the center of the abrasive base section 40 is the annular ring projection 38 with a height 38H forming the tallest concentric cylindrical core. Further, projecting downwardly at the perimeter of the abrasive base layer 30 is the annular ring projection 34 which forms the shortest concentric cylindrical core with a height 34H. The ring projection 36 and corresponding height 36H, being concentrically positioned between annular ring projections 34 and 38, has an intermediate height such that 34H<36H<38H. The annular ring projections 34, 36 and 38 point downwardly with a width 44, with the result that symmetrical channels or grooves with a width 42 are formed between the adjacent pairs of ring projections 34, 36 and 38. It is to be noted that the ring projections 34, 36 and 38 of embodiment C1 are proportional to each other, such that the width 42 of ring projections 34, 36 and 38 is equal. Further, in the embodiment C1, the inter-ring gap, or channel width, 44 between ring projections 34, 36 and 38 is identical. The thus formed projections 34, 36 and 38 are adapted to penetrate the substrate layer 10 and interlock with corresponding grooves or channels 14, 16 and 18 on the substrate layer 10 to form a tightly integrated compact.

Turning now to the substrate layer 10 of the embodiment C1 of the present invention, the substrate layer 10 has a base section 20 with a bottom face 12 which allows the compact C1 to be mounted to the drilling equipment. Further, the base section 20 has concentric upwardly pointing grooves, receptacles or channels 14, 16 and 18 which are adapted to receive and interlock with annular ring projections 34, 36 and 38. The grooves 14, 16 and 18 have corresponding groove heights 14H, 16H and 18H which are equal to the corresponding track heights 34H, 36H and 38H. Further, the groove heights conform generally to the relationship 14H<16H<18H. Preferably, the grooves 14, 16 and 18 are identical in width 24 which equals the ring projection width 44. Further, the corresponding widths 22 and 42 are also equal. Thus, the exploded perspective view of embodiment C1 of the present invention illustrates the downwardly pointing ring projections 34, 36, 38 on the abrasive layer 30 being adapted to cooperate and interlock with the corresponding receptacles or grooves 14, 16, 18 on the base layer 10 of FIG. 1. Additionally, although not shown, the non-planar PCD can have a witness mark or a logo placed on the top surface or on the side of the PCD to indicate channel/projection alignment on abrasive compacts with a non-planar interface or to indicate origin of the compact, as discussed in U.S. patent application Ser. No. 08/694,604, entitled "WITNESS MARK FOR NON-PLANAR CUTTER ORIENTATION", filed by JOHN B. YORSTON, JOHN T. DEVLIN, and DEEPTHI RAJ SETLUR on Aug. 9, 1996, the content of which is hereby incorporated by reference.

Figure 2:
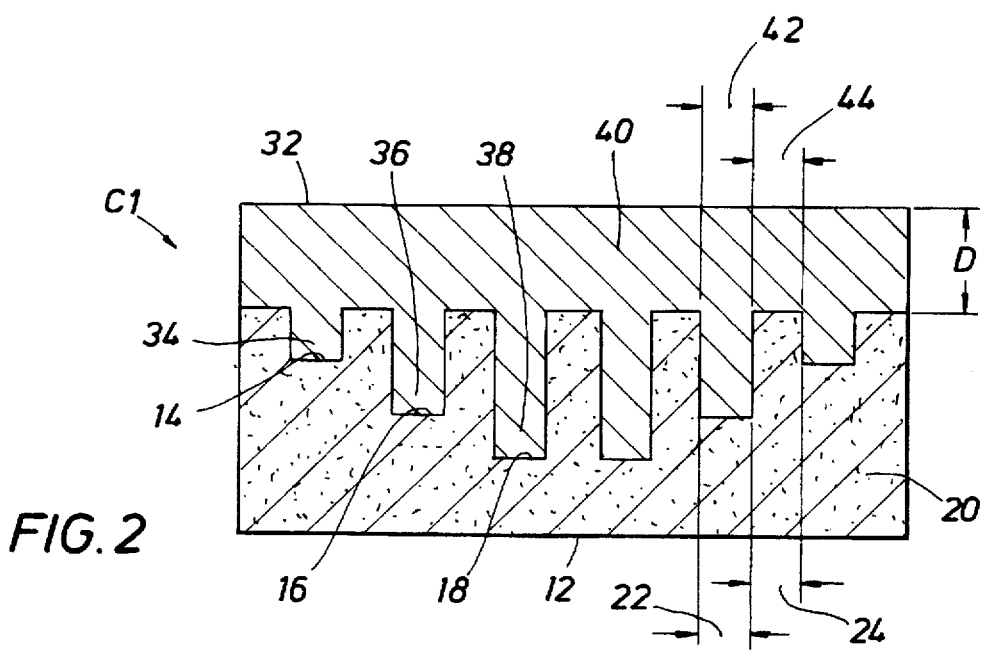
FIG. 2 is a cross-sectional side view of the sintered compact of FIG. 1.

FIG. 2 shows a cross-sectional, cut-away side view of the compact C1 of FIG. 1 after the abrasive layer 30 has been sintered to the substrate layer 10. In FIG. 2, the substrate layer 10 is interlocked with the abrasive layer 30. FIG. 2 shows the teeth like downwardly pointing annular ring projections 34, 36 and 38 embedded within the corresponding grooves 14, 16 and 18. FIG 2 further shows that the ring projection 38 and the groove 38 have a matching height 36H which is greater than the matching height 34H of the ring projection 34 and the groove 14. Further, the ring projection 36 and interlocking groove 16 have a height 36H which conforms to the relation 34H<36H<38H. Additionally, FIG. 2 shows that the width 42 of the ring projections 34, 36 and 38 is symmetrical and is equal to the channel width 44 of the ring projections 34, 36 and 38. Preferably, the substrate layer 10 and the abrasive layer 30 are bonded together using the sintering process, as is known in the art.

Figure 3:
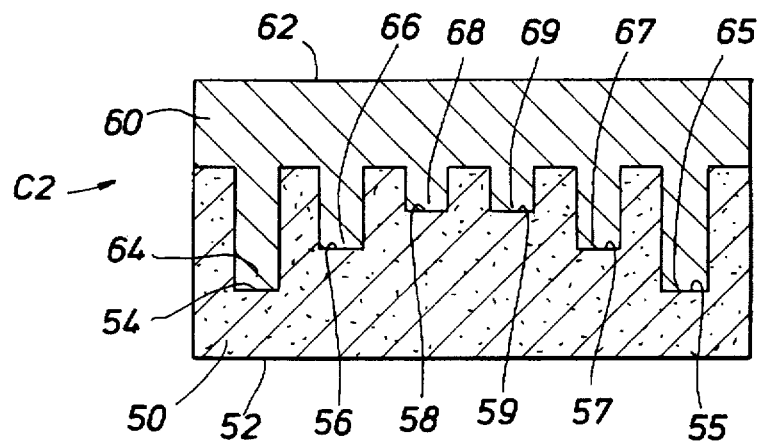
FIG. 3 is a cross-sectional side view of a second embodiment of the compact of FIG. 2.

In FIG. 3, a cutaway side view of embodiment C2 is disclosed where the height relationship among the tracks is reversed from that of FIGS. 1 and 2 such that outer ring projections are greater than the depth of inner ring projections. FIG. 3 has a substrate layer 50 with a bottom face 52 and a plurality of channels 54, 56 and 58. FIG. 3 also has an abrasive layer 60 having a top face 62 and a plurality of downwardly pointing annular ring projections 64, 66 and 68 which are adapted to cooperate with channels 54, 56 and 58 of the substrate layer 50. Further, the ring projection/channel combination 64 and 54 has a height which is greater than that of the ring projection/channel combination 68 and 58. Additionally, the ring projection/channel combination 66 and 56 has a height which is less than that of the ring projection/channel combination 64 and 54, but is greater than the height of the ring projection/channel combination 68 and 58. Correspondingly, a channel half 55 and a ring projection half 65 of the channel 54 and ring projection 64 combination have a height which is greater than the height of combination halves of channel 59/ring projection 69 and the channel 57/ring projection 67. Thus, in FIG. 3, the depth of the ring projections 64, 66 and 68 extending into the channels 54, 56 and 58 within the substrate layer 50 are deeper at the outer concentric channels than at the inner concentric channels in the surface of substrate layer 50.

The thus disclosed embodiment C2 has repeatable grooves that are deeper on the outside perimeter than at the center of the compact. In certain applications, this configuration allows the PCD cutter to minimize the residual stress caused by pressing the layers 10 and 20 together. This stress is greater at the perimeter of the PCD compact C2 than at the center of the PCD compact C2. Hence, the deeper grooves 54 on the perimeter of the embodiment C2 relieve the stress by averaging or distributing the stress across the entire carbide substrate layer 10 rather than localizing the stress so as to lead to potential fracture openings.

While embodiments C1 and C2 of FIGS. 1, 2 and 3 provide that the width be identical for the interlocking ring projections and corresponding channels as shown, such width may be varied to enhance the durability of the bonded layers in specific spots of the compact. For example, depending on factors such as the composition of the materials and process conditions used in forming the composite compact, as well as the specific application for which the composite compact is to be used, the individual width of interlocking channels may be adjusted to obtain an optimal relationship with respect to the depths of the interlocking channels.

Figure 4:
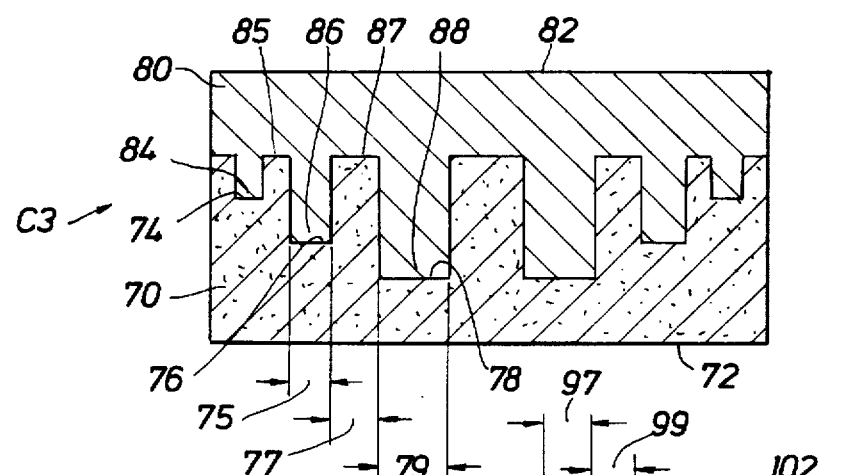
FIG. 4 is a cross-sectional view of a third embodiment of the compact of FIG. 2.

FIG. 4 shows an embodiment C3 where the annular ring projection and respective channel widths are variable. Embodiment C3 has a substrate layer 70 and an abrasive layer 80. The substrate layer 70 has a bottom face 72 which is adapted for bonding the compact C3 to the drilling equipment. Further, the abrasive layer 80 has a top surface 82 which is adapted to face the target objects. The abrasive layer 80 has a plurality of downwardly pointing annular ring projections 84, 86 and 88. Correspondingly, the substrate layer 70 has a plurality of channels 74, 76 and 78 which are adapted to cooperate and interlock with annular ring projections 84, 86 and 88 of the abrasive layer 80.

The ring projections 84, 86 and 88 of the abrasive layer 80 have variable widths, in contrast to the fixed width 44 of FIGS. 1 and 2. In FIG. 4, downwardly pointing ring projections 86 and 88 have widths 75 and 79, respectively. The width 75 differs from the width 79. Further, a plurality of channels 85 and 87 exist between ring projections 84 and 86 and between ring projections 86 and 88 respectively. The widths of channels 85 and 87 are also different. Thus, as shown in FIG. 4, the embodiment C3 offers variable width interlocking channels 74, 76 and 78 such that an optimal relationship is achieved with respect to the interlocking channels and the strength of the compact C3 as the grooves 74, 76 and 78 with differential widths of embodiment C3 offer more surface area for bonding to occur. Since a larger surface is available for bonding, a greater bond strength, or sintering strength or interface strength, exists between the diamond abrasive layer 80 and the carbide substrate layer 70 of the compact C3.

Figure 5:
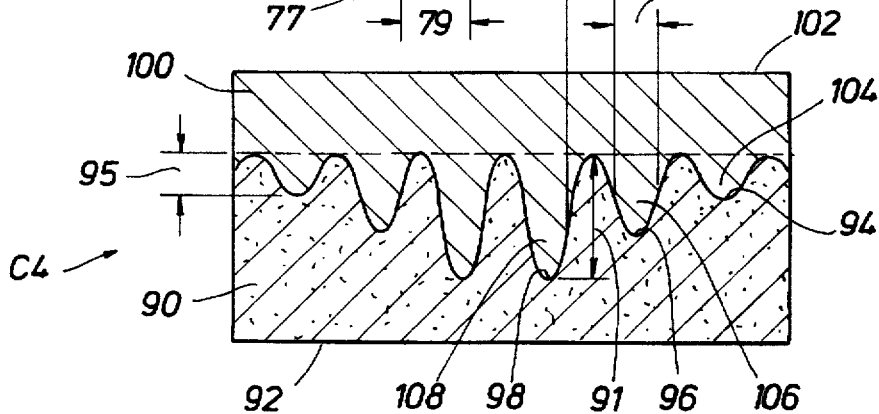
FIG. 5 is a cross-sectional side view of another embodiment of the compact of FIG. 2.

In non-planar interface PCDs, thermal and impact forces are likely to be more concentrated at points of topographical irregularities between the layers. To minimize potential disruptions caused by sharp edges, the present invention deploys PCDs with smooth or round projections. FIG. 5 shows an embodiment C4 where the downwardly pointing projections and grooves of the compact C4 are sinusoidal. In the embodiment C4, the downwardly pointing projections or fingers 104, 106 and 108 peaks at the same level on an abrasive layer 100 at one end and have differential amplitudinal projections into the corresponding grooves 94, 96 and 98 on the substrate layer 90.

FIG. 5 shows the substrate layer 90 which is adapted to receive an abrasive layer 100. The abrasive layer 100 has a plurality of rounded grooves 104, 106 and 108. Correspondingly, the substrate layer 90 has a plurality of channels 94, 96 and 98 which are adapted to receive and interlock with respective grooves 104, 106 and 108. Further, in FIG. 5, the inter-projection distance 97 and the width 99 of the groove on track 106 are equal, leading to symmetrically arranged concentric rings of grooves with rounded edges. These rounded grooves 94, 96 and 98 form concentric rings with height 95 at the perimeter which is less than height 91 at centrally located grooves. Further, in FIG. 5, the ends of the grooves 104, 106 and 108 nearest to the base of the abrasive layer 100 are aligned in a planar manner. Thus, the embodiment C4 of the present invention deploys grooves 94, 96 and 98 with substantially rounded groove edges to achieve a more uniform topography between the layers. Preferably, the grooves are sinusoidal in shape such that the rounded, smooth edges can be provided. Alternatively, the grooves 94, 96 and 98 may be flat at the ends and rounded only near the edges. In this manner, the stress at points of topographical irregularity is thereby reduced while the cracks can be localized by the grooves/projections.

Figure 6:
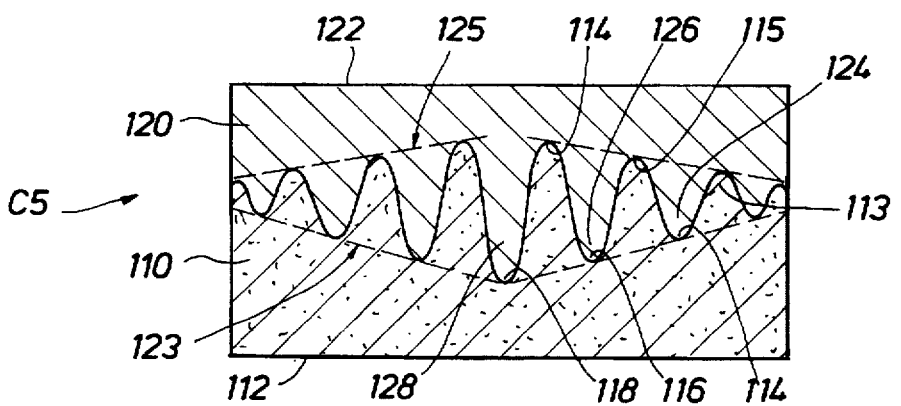
FIG. 6 is a cross-sectional side view of another embodiment of FIG. 5.

Turning now to FIG. 6, an embodiment C5 is shown where the ends of grooves sharably permeate within both an abrasive layer 120 and a substrate layer 110, in contrast to the partially aligned projections 104, 106 and 108 of FIG. 5. In FIG. 6, the substrate layer 1 10 is bonded to the abrasive layer 120. The substrate 110 has a plurality of channels with troughs 114, 116 and 118 and peaks 113, 115 and 117. Correspondingly, the abrasive layer 120 has a plurality of grooves 124, 126 and 128 which are adapted to interlock with channels 114, 116 and 118 of the substrate layer 110. Further, the abrasive layer 120 has channels that are adapted to receive the peaks 113, 115 and 117 of the base layer 110. Thus, the peaks and troughs of the channels of FIG. 6 form a sinusoidally damped pattern, as outlined by the sloped dashed lines 123 and 125 of FIG. 6.

The configuration of FIG. 6 is advantageous in that, when the amplitudes of the grooves are varied such that certain grooves are taller or deeper than other grooves, if a crack develops and propagates through the diamond abrasive layer 120 or the carbide abrasive layer 110, if the next groove is of a depth that is either shallower or deeper than the previous groove, the crack is likely to be captured by one of the grooves. The capture of the crack stops the propagation of the crack within the groove. Hence, the grooves with differential heights of FIGS. 5 and 6 form one or more crack arrestors.

Figure 7:
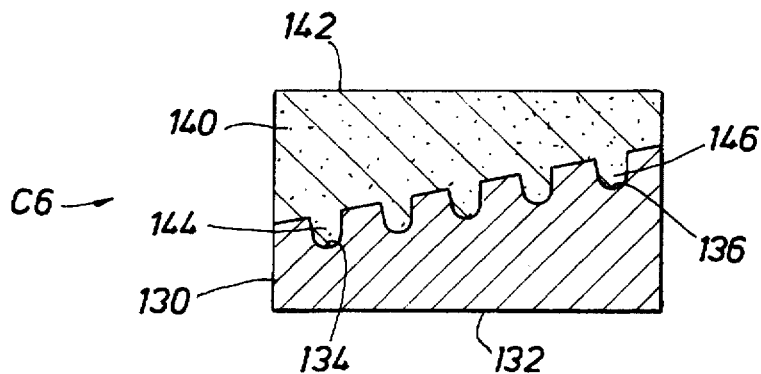
FIG. 7 is a cross-sectional side view of an upwardly sloped interface embodiment of the compact of FIG. 2.
Figure 8:
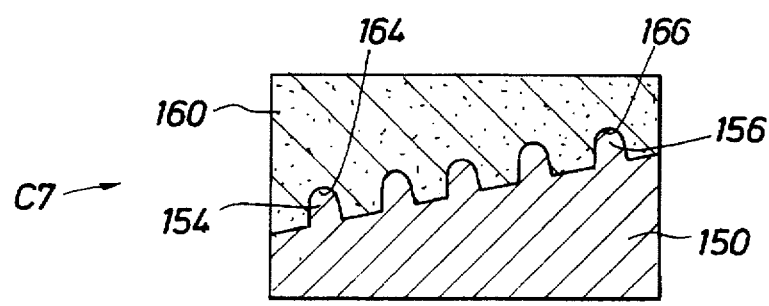
FIG. 8 is a cross-sectional side view of another embodiment of the compact of FIG. 7.

Turning now to FIGS. 7 and 8, compact embodiments C6 and C7 having upwardly sloped inclined interfaces are disclosed. In FIG. 7, a substrate layer 130 is shown which is adapted to be coupled to an abrasive layer 140. The substrate layer 130 has a bottom face 132, while the abrasive layer 140 has a top face 142. Further, the abrasive layer 140 has a plurality of downwardly pointing projections, preferably rounded projections 144 and 146. Further, the projection 146 is positioned at an inclined position which is above that of the projection 144. Correspondingly, the substrate layer 130 has a plurality of channels, preferably round shaped channels 134 and 136 which are adapted to receive projections 144 and 146.

FIG. 8 shows an embodiment C7 which is another embodiment of the compact C6 of FIG. 7. In FIG. 8, a substrate layer 150 has a plurality of projections 154 and 156 located at an inclined distance on the upwardly sloped interface. Correspondingly, an abrasive layer 160 has a plurality of channels 164 and 166 which are adapted to receive and interlock the projections 154 and 156 of the substrate layer 150.

Figure 9:
FIG. 9 is a cross-sectional side view of a downwardly angled interface embodiment of the compact of FIG. 7.
Figure 10:
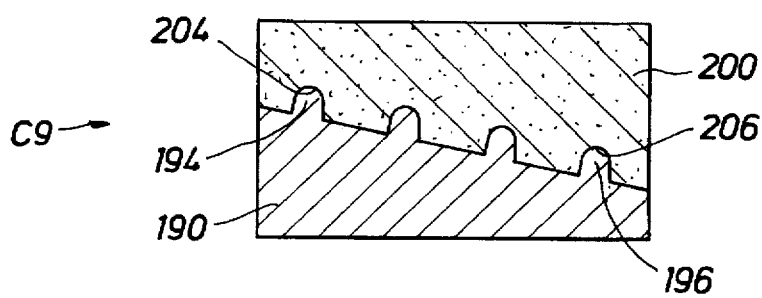
FIG. 10 is a cross-sectional side view of another embodiment of the compact of FIG. 9.
Figure 11:
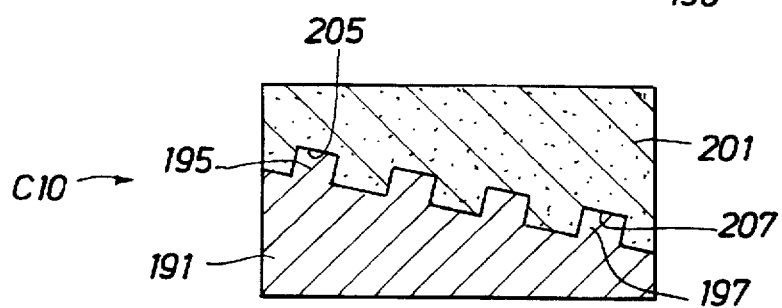
FIG. 11 is a cross-sectional side view of another embodiment of the compact of FIG. 10.

Turning now to FIGS. 9, 10 and 11, compacts C8, C9 and C10 are shown as having negatively sloped incline interfaces. In FIG. 9, the compact C8 has an abrasive layer 180 with a plurality of projections 184 and 186. The projection 184 is positioned at a higher position than that of the projection 186. Correspondingly, a substrate layer 170 is shown with a plurality of channels 174 and 176 positioned at different heights in the substrate layer 170 of the compact C8. Further, the channels 174 and 176 are adapted to receive projections 184 and 186 of the abrasive layer 180.

Referring now to FIG. 10, an alternate embodiment C9 from embodiment C8 of FIG. 9 is shown. In FIG. 10, a substrate layer 190 has a plurality of rounded projections 194 and 196 which are height-wise located differentially on the compact C9. Further, an abrasive layer 200 has a plurality of channels 204 and 206 which are adapted to receive projections 194 and 196 on the substrate layer 190. Preferably, the grooves and channels of FIGS. 9 and 10 are rounded, or curvilinear, in shape.

Turning now to FIG. 11, an embodiment C10 is shown. In FIG. 11, a substrate layer 191 is shown with a plurality of linear shaped or square shaped projections located at different heights in the compact C10. The substrate layer 191 has projections 195 and 197, wherein the projection 195 is located at a higher position than the projection 197. Correspondingly an abrasive layer 201 has a plurality of linear shaped channels such as square-shaped or rectangular-shaped channels 205 and 207 which are adapted to receive and interlock with linear shaped projections 197 and 195 of the substrate layer 191. Although FIGS. 9, 10 and 11 show rounded as well as square-shaped grooves, any other shape known to those skilled in the art may be deployed, including rectangular, oval, or polygon shaped projections/groove combinations may be deployed.

Thus, embodiments C6, C7, C8, C9 and C10 provide compacts with a thicker abrasive layer on one side than the other side. This feature is important in certain applications where the drilling or blasting operation tends to cause the compact to wear away on one side more than on the other side. The sloped incline surface compensates for the heavier wear on one side, leading to a longer life for compact embodiments C6, C7, C8, C9 and C10 if they are properly oriented in the drill bit. Further, the configurations of embodiments C7, C9 and C10 where projections on the substrate layer grip the channels on the abrasive layers provide an advantage in that, if the crack develops in the abrasive layer, the propagation of the crack through the interface will be arrested by the carbide substrate layers. Alternatively, in embodiments C6 and C8 where the projections from the abrasive layers delve into the substrate layers in the event of a crack which emanates from the substrate layers, the development of the crack will be arrested by the projections on the carbide substrate layers.

Figure 12:
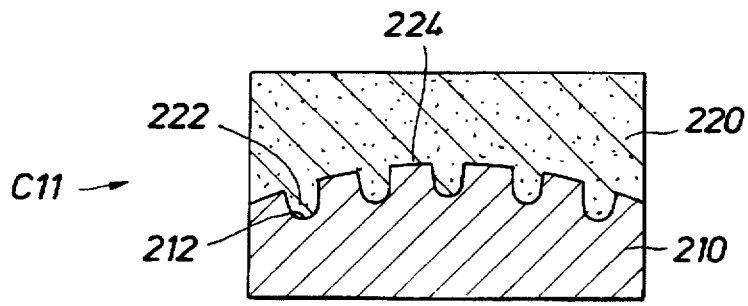
FIG. 12 is a cross-sectional side view of an upwardly curved embodiment of the compact of FIG. 2.
Figure 13:
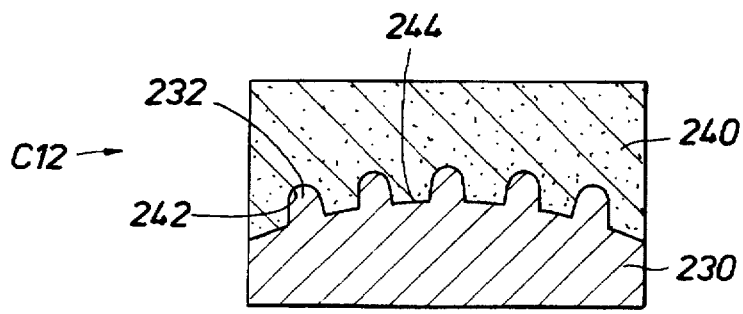
FIG. 13 is a cross-sectional side view of another embodiment of the compact of FIG. 12.

Turning now to FIGS. 12 and 13, an upwardly curved compact interface is shown. In FIG. 12, an embodiment C11 has a substrate layer 210 having an upwardly curved interface 224. Further, the substrate layer 210 has a plurality of channels 212 which are rounded in shape and positioned in a regular array across the upwardly curved interface 224. Correspondingly, an abrasive layer 220 has a concave face to cooperate with the upwardly curved interface 224. Further, the abrasive layer 220 has a plurality of projections 222 which are adapted to interlock with channels 212 of the substrate layer 210.

FIG. 13 shows a variation of the embodiment C11 of FIG. 12. In FIG. 13, an embodiment C12 has a substrate layer 230 having an upwardly curved interface 244 and a plurality of projections 232 evenly distributed across the upwardly curved interface 244. Correspondingly, an abrasive layer 240 is provided with a plurality of channels 242 which are adapted to receive grooves 232.

Figure 14:
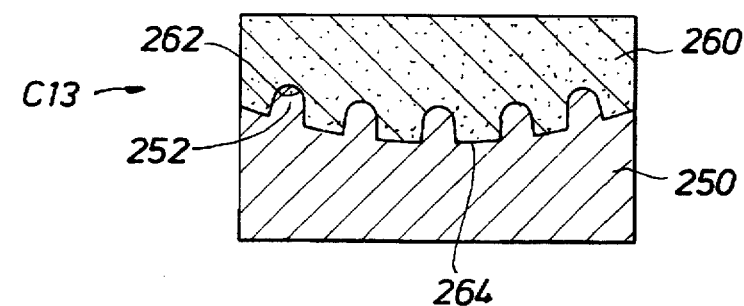
FIG. 14 is a cross-sectional side view of a downwardly curved embodiment of the compact of FIG. 2.
Figure 15:
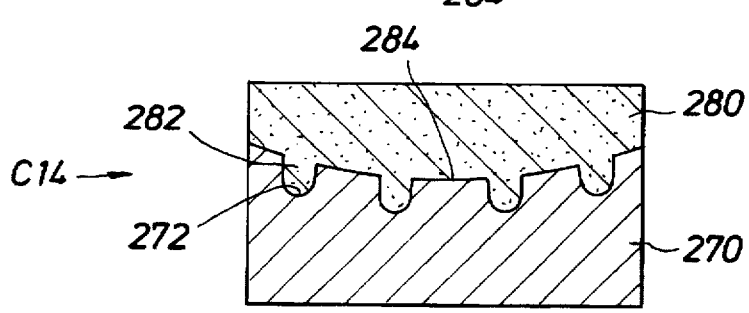
FIG. 15 is a cross-sectional side view of another embodiment of FIG. 14.
Figure 16:
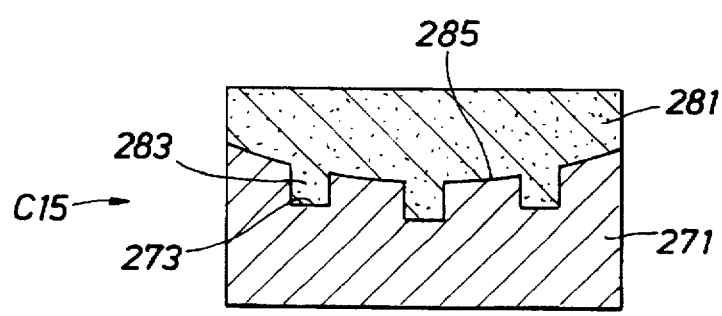
FIG. 16 is a cross-sectional view of another embodiment of the compact of FIG. 15.

Turning now to FIGS. 14, 15 and 16, compacts with downwardly shaped interfaces are disclosed. In FIG. 14, an embodiment C13 has a substrate layer 250 with a downwardly curved interface 264. The substrate layer 250 has a plurality of projections 252, while the abrasive layer 260 has a plurality of channels 262 which are adapted to interlock with the projections 252. Alternatively, in FIG. 15, an embodiment C14 shows a downwardly curved interface 284 where an abrasive layer 280 has a plurality of projections 282 and a substrate layer 270 has a plurality of channels 272 which are adapted to interlock with grooves 282 of the embodiment C14.

In FIG. 16, a variant of FIG. 15 is shown. In FIG. 16, an embodiment C15 substitutes the rounded/curved projections 282 of FIG. 15 with square-shaped projections 283. Thus, the embodiment C15 has a substrate layer 271 having the downwardly curved interface 285 and square-shaped channels 273. Further, an abrasive layer 281 has a plurality of square-shaped projections 283 which are adapted to interlock with the square-shaped channels 273 of the substrate layer 271.

Thus, as shown in FIGS. 12-16, embodiments C11 and C12 provide thick abrasive ends on either side of the respective compacts to eliminate the necessity to orient the compact in the drill bit. Conversely, embodiments C13, C14 and C15 support a thicker abrasive portion of the center of the compacts to better support drilling tools which are applied mainly at the center of the drilling tool. Thus, embodiments C6–C15 provide tailorability such that the compacts can be selected to offer specific thicker abrasive regions as needed.

Additionally, although FIGS. 7–16 show projections and channels that have symmetrical depths, the present invention contemplates that the projections and channels can have varying depths as well to effect crack arresting features. Further, the present invention also contemplates that the gap distances between the projections and the channels can be symmetrical as well as asymmetrical, depending on the need of the compact application.

Figure 18:
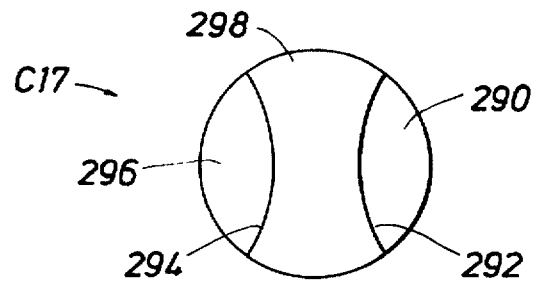
FIG. 18 is a cut-away top view of another embodiment of the compact of FIG. 17.
Figure 17:
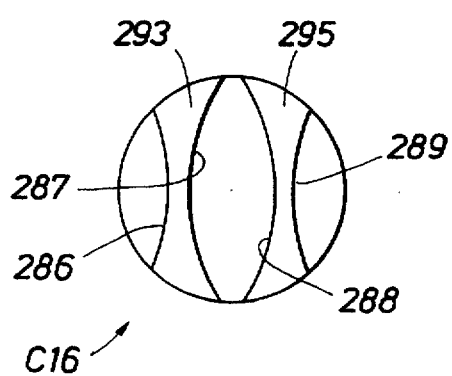
FIG. 17 is a cut-away top view of another embodiment of the compact of the present invention with nonlinear channels and grooves.

Turning now to FIGS. 17 and 18, alternate embodiments of cross-sectional shapes of the projections of FIGS. 1–15 are shown. In FIG. 17, the nonlinear cross-sections of the projections are disclosed in more detail in embodiment C16. In FIG. 17, the cross section of nonlinear projections 293 and 295 are shown. The projection 293 is defined by an inner perimeter 286 and an outer perimeter 287. Correspondingly, the nonlinear cross section of the projection 295 has an inner perimeter 288 and an outer perimeter 289. The inner and outer perimeters 286, 287, 288 and 289 may have different radii.

In FIG. 18, an embodiment C17 has a cross-section projection 218 with a curvilinear cross section, as defined by curved perimeters 292 and 294. The curved perimeters 292 and 294 isolate receptacles 290 and 296 of the substrate layer into two oblong portions. Further, the curve shaped perimeters 292 and 294 may have the same radius value, or alternatively may have different radius values. Thus, FIGS. 17 and 18 show projections and corresponding channels whose cross sections vary in width along the diameter of the interface to form curvilinear cross sections to provide even more surface area to ensure a strong bond between the abrasive and the substrate layers. Further, the present invention contemplates that the projections and channels of FIGS. 17 and 18 can have varying depths as well to effect crack arresting features. Also, the present invention contemplates that the gap distances between the projections and the channels can be symmetrical as well as asymmetrical, depending on the need of the compact application.

Figure 19:
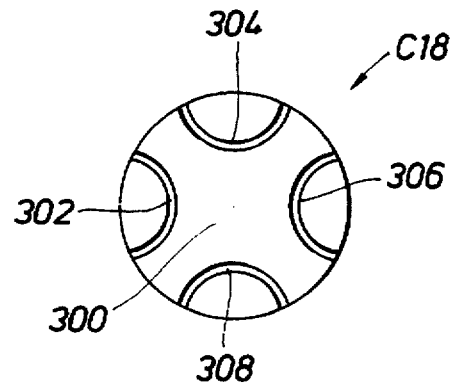
FIGS. 19-23 are cut-away top views of embodiments of the compact of the present invention with curved segments for the grooves and channels of the present invention.
Figure 20:
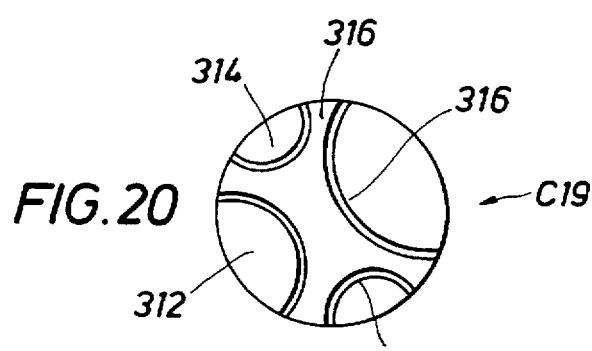
Figure 21:
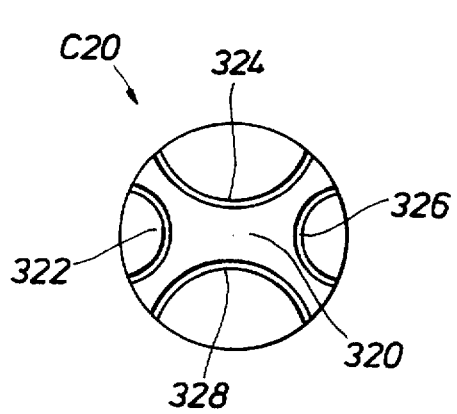
Figure 22:
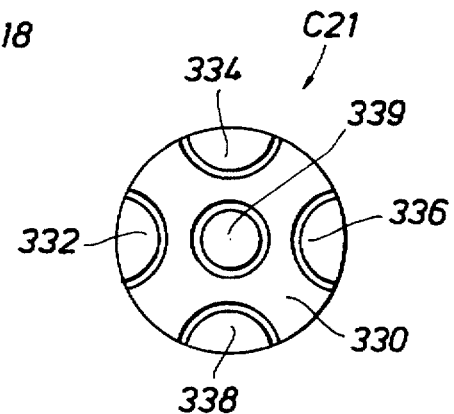
Figure 23:
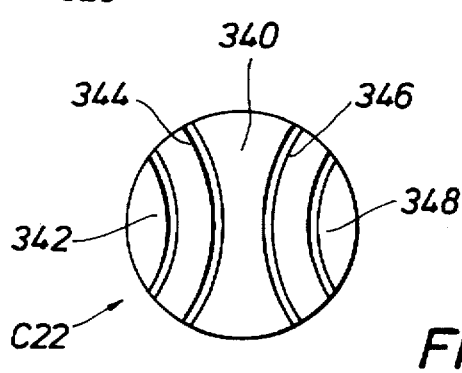

Even though the grooves as shown in the embodiments C1–C17 are continuous, an advantage exists for configurations where the projections and grooves start and stop along their path. Thus, FIGS. 19, 20, 21, 22 and 23 show cross-sectional patterns ingrained into the interface surface. In FIG. 19, an embodiment C18 has a plurality of grooves 302, 304, 306 and 308 which are semicircular in shape and which allow the abrasive layer 300 to interlock with a corresponding substrate layer 300 (not shown). Further, although the embodiment C18 of FIG. 19 shows grooves 302, 304, 306 and 308 as having the same radius value, the radius value may be variable. As shown in FIG. 20, an embodiment C19 shows a plurality of semicircular grooves 312, 314, 316, 318, each of which has a unique radius associated with each of the grooves 312, 314, 316 and 318. Alternatively, in FIG. 21, an embodiment C20 discloses pairs of grooves 322/326 and 324/328 having identical radius per pair 322/326 and 324/328. Thus, in the abrasive layer 320 of FIG. 21, grooves 322 and 326 share the same radius value, while grooves 328 and 324 are equal in radius.

In reference to FIGS. 1–23, embodiments C1–C22 show variations with respect to the widths or depths of the allowable grooves. These embodiments are advantageous in that they increase the mount of surface area which the abrasive layers can bond to the substrate layers. These features gives the customer the ability to tailor his surface area depending upon the formation he wants to use. Further, the features shown in FIGS. 1–23 allow the user to tailor the length or size of the grooves, depending on the formation needed. For instance, if the application requires a very hard abrasive formation where severe impacts are not of concern, fewer grooves may be used with more diamond mounted thereon for a longer life. Alternatively, if the compact is used in a high impact formation, more grooves can be used to buffer against high impact energy. Further, the present invention contemplates that the grooves could go either into the diamond or into the carbide, that they can be represented mathematically through the radius of a larger circle or concentric circles. Further, the present invention contemplates that the projections and channels of FIGS. 1–23 can have varying depths as well to effect crack arresting features. Also, the present invention contemplates that the gap distances between the projections and the channels can be symmetrical as well as asymmetrical, depending on the need of the compact application.

Thus, the present invention provides compacts where the non-planar-interface between the abrasive and substrate layers provides both increased surface area on which bonding could occur and more uniformly stress distribution over the entire surface of the compact. The topography between the substrate and abrasive layers of the compact may be characterized by interlocking concentric circular grooves and channels of varying widths, depths and shapes. Alternatively, the groove and channel interface can be rounded and smooth. Further, the grooves and channels can be positioned on a substantially angled interface or a substantially curved interface. The present invention also discloses configurations where the grooves alternatingly start and stop along the path in interfacing with their respective channels. Additional configurations disclosed include variations in the width of the groove/channel along the diameter of the abrasive layer and the substrate layer. The present invention thus provides increased mechanical interlock between the abrasive layer and the substrate layer. Further, the increased surface area between the substrate and abrasive layers promotes the sintered bond between them, thereby improving resistance to the spalling or the delamination of the abrasive layer from the substrate layer.

The present invention contemplates that the term PCD can also refer to compacts having an abrasive layer besides diamond, including but not limited to cubic boron nitride, wurtzite boron nitride, and combinations thereof. Furthermore, it should be understood that the compact substrate may include any hard surface, especially a carbide of one of the group IVB, VB, or VIB metals, or alloys thereof.

It is to be understood that the above-described arrangements are only illustrative of an application of the present invention. Numerous modifications and alternative arrangements may be devised by those skilled in the art without departing from the spirit and scope of the present invention and the appended claims are intended to cover such modifications and arrangements.

What is claimed:

1. A cutting element, comprising:

a substrate layer having a first surface, the first surface being formed with a plurality of concentric annular channels, said substrate layer having an innermost channel, an outermost channel and one or more channels in between, said innermost channel having an innermost height, said outmost channel having an outermost height, and said channels in between having middle heights, said innermost height being different from said outermost height and said middle heights having values spanning said innermost height and said outermost heights; and an abrasive layer having a cutting surface and an opposed mounting surface adapted to be bonded to said substrate layer, said opposed mounting surface having a plurality of concentric annular ring projections being adapted to interlock with the respective concentric annular channels in said substrate layer, each of said ring projections having a depth matching the height of the corresponding annular channel of said substrate layer.

2. The curing element of claim 1, wherein said innermost height is less than said outermost height.

3. The cutting element of claim 1, wherein said innermost height is greater than said outermost height.

4. The cutting dement of claim 1, further comprising a gap between one ring projection and an adjacent ring projection, each ring projection has a projection width and each channel corresponding to each ring having an identical projection width, wherein said gap has a gap width which is equal to said projection width.

5. The cutting element of claim 1, further comprising a gap between one ring projection and an adjacent ring projection, each ring projection has a projection width and each channel corresponding to each ring having an identical projection width, wherein said gap has a gap width which differs from said projection width.

6. The cutting element of claim 1, wherein each of said ring projections and each of said corresponding channel have a matching curvilinear shape.

7. The cutting element of claim 6, wherein said curvilinear shaped ring projections and channels extend into said substrate layer and said abrasive layer.

8. A cutting element, comprising:
 a substrate layer having a first surface, the first surface being formed with a plurality of channels, said substrate layer having an innermost channel, an outermost channel and one or more channels in between, said substrate layer has a first substrate side having a first substrate side height and a second side having a second substrate side height; and
 an abrasive layer having a cutting surface and an opposed mounting surface adapted to be bonded to said substrate layer, said opposed mounting surface having a plurality of projections being adapted to interlock with the respective channels in said substrate layer, said abrasive layer having an abrasive layer first side with a first abrasive side height and an abrasive layer second side with a second abrasive side height, said second abrasive side height being unequal to said first abrasive side height, said first substrate side height and said first abrasive side height combination being substantially equal to said second substrate side height and said second abrasive side height combination.

9. The cutting element of claim 8, wherein said ring projections and said channels are concentric annular ring projections and concentric annular channels.

10. The cutting element of claim 8, wherein said innermost channel has an innermost height, said outmost channel has an outermost height, and said channels in between have middle heights, said innermost height being different from said outermost height and said middle heights having values spanning said innermost height and said outermost heights, wherein each of said projections has a depth matching the height of the corresponding annular channel of said substrate layer.

11. The cutting element of claim 8, wherein said first substrate side height is shorter than said second substrate side height.

12. The cutting element of claim 8, wherein said channels recess within said substrate layer.

13. The cutting element of claim 8, wherein said channels project from said substrate layer and said projections on said abrasive layer is recessed within said abrasive layer to receive said projecting channels.

14. The cutting element of claim 8, further comprising a gap between one projection and an adjacent projection, each projection has a projection width and each channel corresponding to each ring having an identical projection width, wherein said gap has a gap width which is equal to said projection width.

15. The cutting element of claim 8, further comprising a gap between one projection and an adjacent projection, each projection has a projection width and each channel corresponding to each ring having an identical projection width, wherein said gap has a gap width which differs from said projection width.

16. The cutting element of claim 8, wherein each of said projections and each of said corresponding channel have a matching curvilinear shape.

17. The cutting element of claim 8, wherein said curvilinear shaped projections and channels extend into said substrate layer and said abrasive layer.

18. The cutting element of claim 8, wherein said abrasive layer has an abrasive layer central depth located at the center of said abrasive layer, said abrasive layer central heights being different from said first and second abrasive side depths, wherein said substrate layer has a central substrate depth matching said abrasive central depth.

19. The cutting element of claim 18, wherein said abrasive layer central depth cooperates with said first and second abrasive side depths to form a curvilinear interface.

20. The cutting element of claim 18, wherein said curvilinear interface is an upwardly shaped curvilinear interface.

21. The cutting element of claim 18, wherein said curvilinear interface is a downwardly shaped curvilinear interface.

22. A cutting element, comprising:
 a substrate layer having a first surface, the first surface being formed with one or more segmented curvilinear channels, said channels having at least two centers of curvatures; and
 an abrasive layer having a cutting surface and an opposed mounting surface adapted to be bonded to said substrate layer, said opposed mounting surface having one or more segmented curvilinear projections, said projections being adapted to interlock with the respective channels in said substrate layer.

23. The curing element of claim 22, wherein one of said curvilinear shape is a semi-circular shape.

24. The curing element of claim 22, wherein one of said curvilinear shape is a concave shape.

25. The cutting element of claim 22, wherein said curvilinear shape is a convex shape.

26. A cutting element, comprising:
 a substrate layer having a first surface, the first surface being formed with at least one segmented channel having a pair of arcuate sidewalls, each sidewall having different centers of curvature; and
 an abrasive layer having a cutting surface and an opposed mounting surface adapted to be bonded to said substrate layer, said opposed mounting surface having one or more projections being adapted to interlock with the respective segmented channel in said substrate layer.

* * * * *